(12) United States Patent
Chuang et al.

(10) Patent No.: US 10,824,027 B2
(45) Date of Patent: Nov. 3, 2020

(54) DISPLAY PANEL

(71) Applicant: Innolux Corporation, Miao-Li County (TW)

(72) Inventors: Kuo-Liang Chuang, Miao-Li County (TW); Shu-Lan Chen, Miao-Li County (TW); Chiu-Lien Yang, Miao-Li County (TW); Sheng-Nan Fan, Miao-Li County (TW); Shih-Hsiung Wu, Miao-Li County (TW); Jui-Chu Lai, Miao-Li County (TW); Feng-Yu Lin, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/351,726

(22) Filed: Mar. 13, 2019

(65) Prior Publication Data

US 2019/0285928 A1    Sep. 19, 2019

(30) Foreign Application Priority Data

Mar. 14, 2018 (CN) .......................... 2018 1 0208780
Mar. 8, 2019 (CN) .......................... 2019 1 0176924

(51) Int. Cl.
*G02F 1/1339* (2006.01)
*G02F 1/1335* (2006.01)

(52) U.S. Cl.
CPC .... *G02F 1/13394* (2013.01); *G02F 1/133512* (2013.01); *G02F 2001/13396* (2013.01); *G02F 2001/13398* (2013.01); *G02F 2201/56* (2013.01); *G02F 2202/28* (2013.01)

(58) Field of Classification Search
CPC ................................................. G02F 1/13394
See application file for complete search history.

(56) References Cited

U.S. PATENT DOCUMENTS

| 2016/0131932 | A1* | 5/2016 | Hsiao | G02F 1/13394 |
| | | | | 349/42 |
| 2016/0195761 | A1* | 7/2016 | Liu | G02F 1/133514 |
| | | | | 257/88 |
| 2017/0090233 | A1* | 3/2017 | Xu | G02F 1/133514 |

* cited by examiner

*Primary Examiner* — Edmond C Lau
(74) *Attorney, Agent, or Firm* — McClure, Qualey & Rodack, LLP (57) ABSTRACT

A display panel includes a first substrate; a second substrate disposed opposite to the first substrate; a display medium disposed between the first substrate and the second substrate; and a first engaging structure including a first protruding portion and a first receiving portion. The first protruding portion is disposed on a first surface of the first substrate, and the first receiving portion is disposed on a second surface of the second substrate. The first receiving portion has a first opening to expose a portion of the second surface of the second substrate. At least a portion of the first protruding portion is disposed within the first opening of the first receiving portion. The first protruding portion and the portion of the second surface of the second substrate exposed from the first opening are spaced apart by a distance.

20 Claims, 10 Drawing Sheets

DISPLAY PANEL

This application claims the benefit of People's Republic of China application Serial No. 201810208780.7, filed Mar. 14, 2018 and Serial No. 201910176924.X, filed Mar. 8, 2019, the subject matter of which is incorporated herein by reference.

BACKGROUND

Technical Field

This disclosure relates to a display panel, and more particularly to a display panel having an engaging structure.

Description of the Related Art

Electronic products, including smartphones, tablet computers (pads), notebook computers, monitors, televisions (TVs) and many associated products, with display panels are indispensable necessities for modern human beings in either working, processing, learning or personal entertainment.

In addition to seeking for the excellent electronic properties of electronic products, such as the high quality display effect, the higher response speed in operation, the long lifetime, the high stability and the like, consumers expect to enjoy the richer and more diversified functions.

Figure 1A:
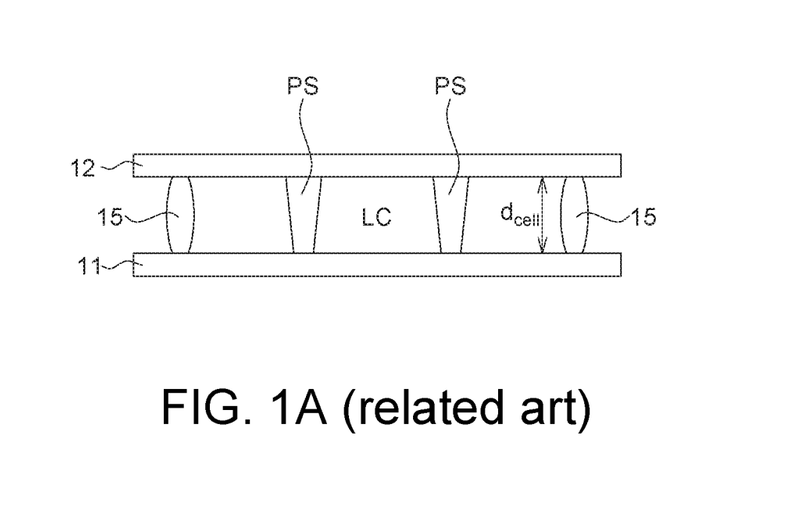
FIG. 1A (related art) is a schematic view showing a conventional display panel.
Figure 1B:
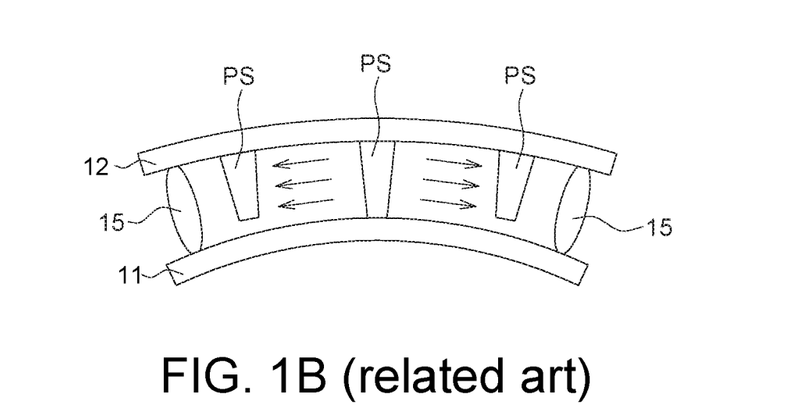
FIG. 1B (related art) is a schematic view showing the conventional display panel in a curved state.

FIG. 1A is a schematic view showing a conventional display panel. FIG. 1B is a schematic view showing the conventional display panel in a curved state. Referring to FIG. 1A, the conventional display panel includes a lower substrate 11 and an upper substrate 12 assembled to each other, a sealant 15 disposed on peripheries of the substrates to adhere the upper and lower substrates, and a display medium, such as liquid crystal LC, disposed between the upper and lower substrates. The display panel further includes a plurality of photo spacers PS disposed between the upper and lower substrates, and the height of the spacer is utilized to maintain the cell gap $d_{cell}$ of the display panel. However, as shown in FIG. 1B, when the conventional display panel is curved, the levels of the spacers PS in the force receiving zone (e.g., the middle curving portion) change, so that the liquid crystal LC flows from the middle toward the peripheral areas on two sides, and the spacers, which are disposed in the peripheral areas on two sides and should originally rest against upper and lower substrates, are separated from one of the substrates. Thus, the overall cell gap of the display panel cannot achieve the good uniformity, and the display effect of the panel is affected.

SUMMARY

According to this disclosure, a display panel is provided. The display panel includes a first substrate; a second substrate disposed opposite to the first substrate; a display medium disposed between the first substrate and the second substrate; and a first engaging structure including a first protruding portion disposed on a first surface of the first substrate, and a first receiving portion disposed on a second surface of the second substrate, wherein the first receiving portion has a first opening to expose the second surface of the second substrate, at least a portion of the first protruding portion is disposed within the first opening of the first receiving portion, and the first protruding portion and the second surface of the second substrate exposed from the first opening are spaced apart by a distance.

The above and other aspects of the invention will become better understood with regard to the following detailed description of the preferred but non-limiting embodiments. The following description is made with reference to the accompanying drawings.

DETAILED DESCRIPTION OF THE INVENTION

Embodiments of this disclosure disclose a display panel, in which the relative movement between the upper and lower substrates is restricted using the mutual engagement of the engaging structures. When the display panel receives an external force and is bent or is manufactured to have a curved region, the engaging structure of the embodiment can keep the good uniformity of the overall cell gap of the display panel, so that the panel with high transmittance achieves the good brightness uniformity, and the display panel using the same can have the stable excellent display effect. Various embodiments of this disclosure will be described in detail with reference to the accompanying drawings in the following. It is to be noted that the structure content and manufacturing of the implementation aspects of the embodiments are provided only for the illustrative purpose, and the scope of this disclosure is not limited to the embodiments. It is to be noted that this disclosure does not show all possible embodiments, and the structure and process of the embodiments may be changed and modified to satisfy the needs of the actual application without departing from the spirit and scope of this disclosure. Therefore, other implementations not presented in this disclosure are also applicable. Furthermore, the same or similar reference numerals in the embodiments are used to indicate the same or similar parts.

Furthermore, the terms used in the specification and the claims, such as "first", second", "third" and the like, are used to modify the elements of the claims, but it does not mean that it has any previous ordinal numbers on behalf of the claimed element, and also does not represent the order of one claimed element and another claimed element, or the order in the manufacturing method, and these ordinals are only used to make one claimed element with a certain name clearly distinguishable from another claimed element with the same name. In addition, when a first material layer is mentioned to be disposed on, above or over a second material layer, it may include direct contact between the first material layer and the second material layer unless otherwise defined. Alternatively, it is also possible to have one or more layers of other materials interposed, in which case there may be no direct contact between the first material layer and the second material layer.

First Embodiment

Figure 2A:
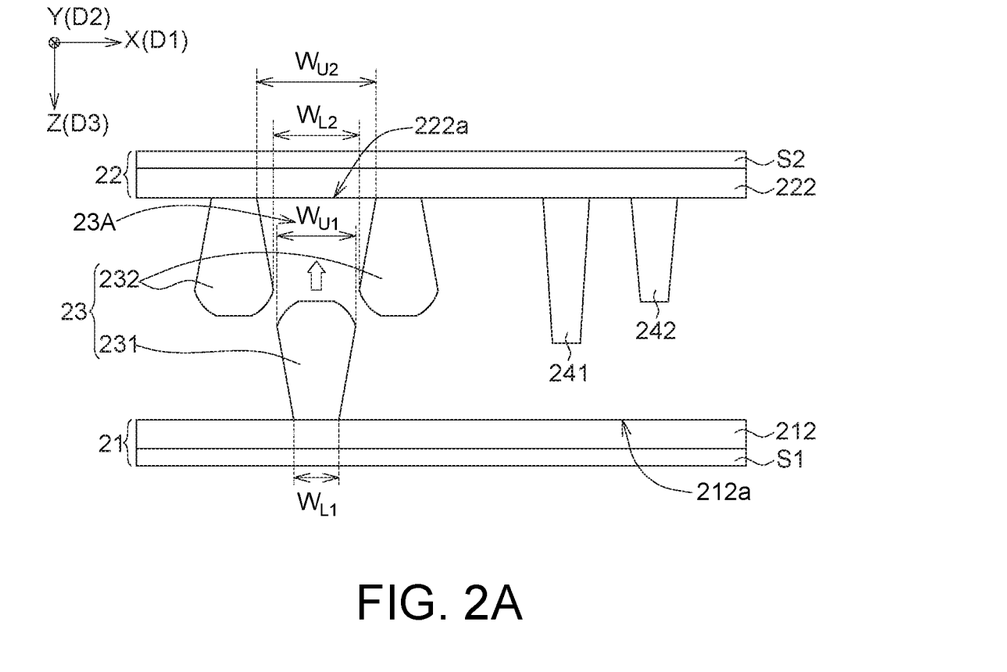
FIG. 2A and FIG. 2B are partial schematic views showing a display panel before and after assembly according to a first embodiment of this disclosure.
Figure 2B:
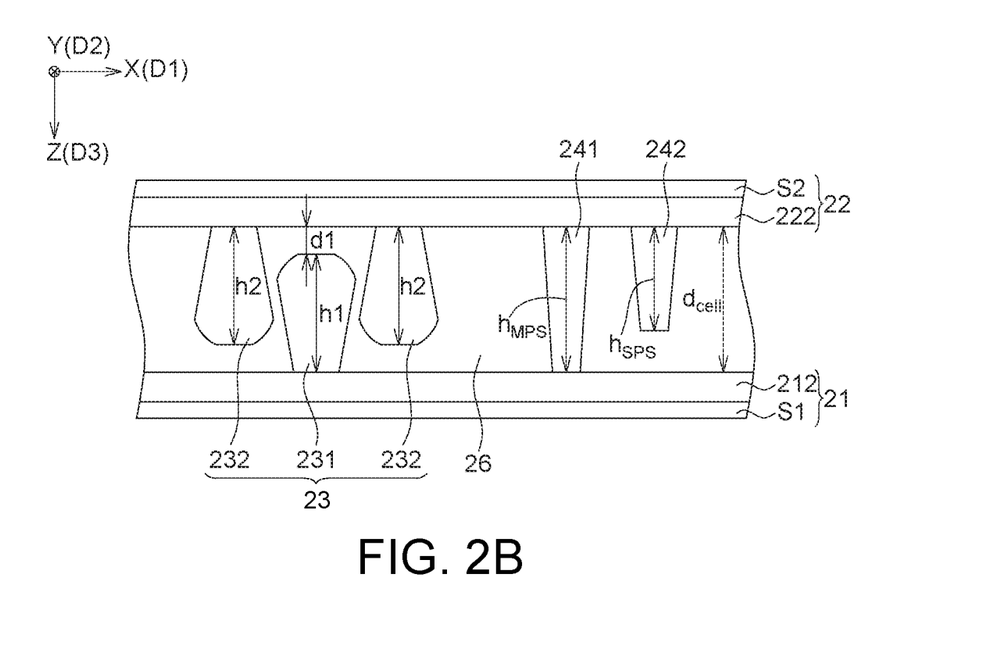

FIG. 2A and FIG. 2B are cross-sectional views, schematically showing a portion of a display panel before and after assembly according to the first embodiment of this disclosure. A display panel of this embodiment includes a first substrate 21, a second substrate 22 disposed opposite to the first substrate 21, and a first engaging structure 23 disposed between the first substrate 21 and the second substrate 22. The display panel may include a plurality of first engaging structures 23. For the clear illustration, FIG. 2A only shows one first engaging structure 23. The first engaging structure 23 includes: a first protruding portion 231 disposed on the first substrate 21 (e.g. disposed on a first surface 212a of the first substrate 21 in one embodiment); and a first receiving portion 232 disposed on the second substrate 22 (e.g. disposed on a second surface 222a of the second substrate 22 in one embodiment). The first receiving portion 232 has a first opening 23A to expose a portion of the surface 222a of the second substrate 22. The second surface 222a of the second substrate 22 can be a plane constituted by a line parallel to a first direction D1 and a line parallel to a second direction D2. The first opening 23A can extend along a third direction D3. The first direction D1, the second direction D2, and the third direction D3 can be perpendicular to each other. However, this disclosure does not limit the configurations of the applications, and the positions of the protruding portion and the receiving portion may also be interchanged. That is, the first protruding portion 231 may be disposed on the second substrate 22 while the first receiving portion 232 is disposed on the first substrate 21, and this configuration also pertains to the scope of this disclosure.

The display panel of this embodiment further includes a sealant (not shown in the drawing) applied onto peripheries of the substrates, and a display medium 26 (e.g., a liquid crystal layer) disposed between the first substrate 21 and the second substrate 22. The display panel may include a first spacer 241 and a second spacer 242 disposed between the first substrate 21 and the second substrate 22. There may be a plurality of first spacers 241, which are configured as main spacers for the display panel. There may be a plurality of second spacers 242, which are configured as sub-spacers for the display panel. The first spacer 241 and the second spacer 242 can be photo spacers. The height $h_{MPS}$ of the first spacer 241 is greater than the height $h_{SPS}$ of the second spacer 242, and the first spacer 241 is used to define and maintain the cell gap $d_{cell}$ of the display panel. When the display panel is pressed by the external force, the second spacer 242 can help to maintain the cell gap between the upper and lower substrates. Each of FIG. 2A and FIG. 2B depicts one first spacer 241 and one second spacer 242 for the illustration. The first engaging structure 23 may also function as and made by the sub-spacer. Additionally, the first engaging structure 23 may comprise a photoresist material, an adhesive material, or combinations thereof.

In one embodiment as shown in FIG. 2A, the first protruding portion 231 has a first upper width $W_{U1}$ and a first lower width $W_{L1}$, wherein the first lower width $W_{L1}$ is closer to the first substrate 21, and the first lower width $W_{L1}$ is smaller than the first upper width $WU_1$. The first opening 23A of the first receiving portion 232 has a second upper width $W_{U2}$ and a second lower width $W_{L2}$, the second upper width $W_{U2}$ is closer to the second substrate 22 and the second lower width $W_{L2}$ is smaller than the second upper width $W_{U2}$. According to some embodiments, the second upper width $W_{U2}$ may be greater than the first upper width $W_{U1}$. According to some embodiments, the second lower width $W_{L2}$ may be greater than the first upper width $W_{U1}$, so that the first protruding portion 231 can be easily accommodated within the first opening 23A of the first receiving portion 232.

As shown in FIG. 2B, after the first substrate 21 and the second substrate 22 are assembled to each other, at least a part of the first protruding portion 231 is disposed within the first opening 23A of the first receiving portion 232, thereby restricting the relative movement between the first substrate 21 and the second substrate 22. The height of the first spacer 241 may be greater than the height of the first protruding portion 231, and may be greater than the height of the first receiving portion 232. In FIG. 2B, for example, the height (or maximum height) h1 of the first protruding portion 231 is smaller than the height (or maximum height) $h_{MPS}$ of the first spacer 241, the height (or maximum height) h2 of the first receiving portion 232 is also smaller than the height (or maximum height) $h_{MPS}$ of the first spacer 241. Furthermore, in one embodiment, after the first substrate 21 and the second substrate 22 are assembled, the first protruding portion 231 and the portion of the second surface 222a exposed by the first opening 23A are spaced apart by a distance dl.

In addition, in one application, the first substrate 21 may be a thin film transistor (TFT) substrate, and the second substrate 22 may be a color filter (CF) substrate. For example, the first substrate 21 shown in FIG. 2A and FIG. 2B includes a first sub-substrate S1, a TFT layer 212. The TFT layer 212 includes, for example, elements (not shown) such as conductive/insulating layers associated with the thin film transistor. The second substrate 22 includes, for example, a second sub-substrate S2, a CF layer 222. The CF layer 222 includes, for example, a plurality of color filter units, such as blue, red and green filter units, a protection film layer such as a planarization layer, other associated elements including structures (not shown) such as electrodes and the like, and black matrix layers (not shown but capable of preventing the incorrect color mixing and light-leakage) disposed between the color filter units. The first substrate 21 can both be a TFT substrate and a CF substrate, and can include, for example, a first sub-substrate S1, a TFT layer 212, and a CF layer 222. In order to illustrate the engaging structure of this embodiment clearly, the first substrate 21 and the second substrate 22 are simply depicted in the drawings. According to other embodiments, the first substrate 21 may be a color filter (CF) substrate, and the second substrate 22 may be a thin film transistor (TFT) substrate. According to some embodiments, the display panel can include alignment films. In such case, an alignment film (not show) can be disposed on the first substrate 21 and can be further optionally disposed on the first protruding portion 231, and another alignment film (not shown) can be disposed on the second substrate 22 and can be further optionally disposed on the first receiving portion 232.

Figure 3A:
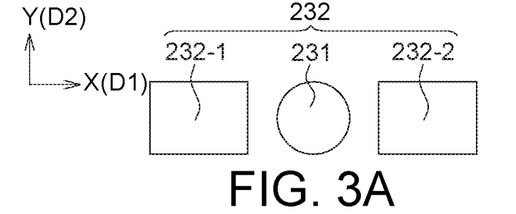
FIG. 3A to FIG. 3D are top views showing the corresponding protruding portion and receiving portion in four applicable configurations of the first engaging structure of the embodiment.
Figure 3B:
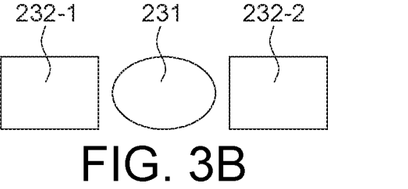
Figure 3C:
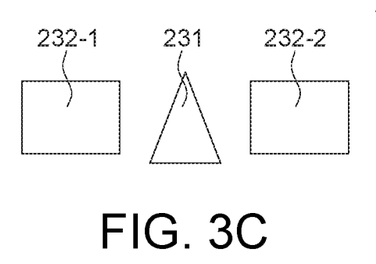
Figure 3D:
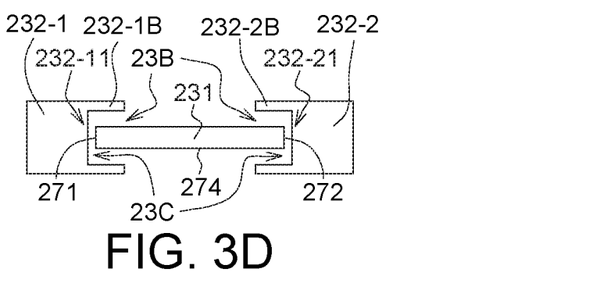

FIG. 3A to FIG. 3D are top views showing the corresponding protruding portion and receiving portion in four applicable configurations of the first engaging structure of the embodiment. FIG. 3A to FIG. 3D respectively show the circular, oval, triangular and rectangular first protruding portion 231 as presented from top views. The first receiving portion 232 of this embodiment has two parts corresponding to at least two opposite sides of the first protruding portion 231. As shown in FIG. 3A to FIG. 3C, the first receiving portion 232 are disposed on the left side 271 and the right side 272 of the first protruding portion 231, respectively. For example, the first receiving portion 232 may have a first part 232-1 and a second part 232-2 corresponding to at least two opposite sides 271 and 272 of the first protruding portion 231 respectively. Alternatively, the first receiving portion 232 shown in FIG. 3D is disposed corresponding to all sides of the first protruding portion 231.

As shown in FIG. 3D, the configuration of FIG. 3D is different from the configurations of FIG. 3A to FIG. 3C in that in addition to the first opening 23A extending along the third direction D3, the first receiving portion 232 of FIG. 3D can further include a second opening 23B. The extending direction of the second opening 23B is different from the extending direction of the first opening 23A. The second opening 23B can extend along the first direction D1 or the second direction D2. At least a part of the first protruding portion 231 is disposed within the second opening 23B of the first receiving portion 232. According to an embodiment, in a top view, the second opening 23B is disposed adjacent to one side of the first protruding portion 231. In detail, in a position adjacent to the side 271 of the first protruding portion 231, the first part 232-1 of the first receiving portion 232 includes a concave portion 23C, thus constituting the second opening 23B. In a position adjacent to another side 272 of the first protruding portion 231, the second part 232-2 of the first receiving portion 232 includes another concave portion 23C, thus constituting another one of the second opening 23B. The side 271 and the side 272 can be oppositely disposed. According to some embodiments, a part 232-11 of the first part 232-1 of the first receiving portion 232 corresponds to the side 271 of the first protruding portion 231, and a part 232-21 of the second part 232-2 of the first receiving portion 232 corresponds to another side 272 of the first protruding portion 231. A part 232-1B of the first part 232-1 may extend along the first direction D1, and a part 232-2B of the second part 232-2 may extend along the first direction D1. At least a portion of the first protruding portion 231 passes through the second opening 23B and is received in the concaved portion 23C as depicted in FIG. 3D. Of course, the first protruding portion 231 and the first receiving portion 232 may have the shapes other than those shown in FIG. 3A to FIG. 3D. The first and second parts 232-1 and 232-2 of the first receiving portion 232 may partially correspond to or fully surround and enclose all sides of the first protruding portion 231, and modifications of FIG. 3A to FIG. 3D are applicable to the this disclosure. This disclosure does not particularly limit the shapes/positions of the protruding portion and the receiving portion.

The display panel of this disclosure may be applied to a curved display panel, a flexible display panel or a bendable display panel. According to the above-mentioned description, when the display panel is improperly forced to generate the bending condition or is manufactured to have a curved region due to the application requirement, the engaging structure (e.g., first engaging structure 23) of the present disclosure can restrict the relative movement between the first substrate 21 and the second substrate 22, and maintain the uniformity of the cell gap of the display panel. In the present disclosure, the shapes of the first protruding portion and the first receiving portion are not limited to the cross-sectional views (e.g. the inverted trapezoidal cross-sectional view) as shown in FIG. 2A and FIG. 2B, and the shapes of the first protruding portion and the first receiving portion are not limited to the top views as shown in FIG. 3A to FIG. 3D. Any modification is deemed as falling within the scope of the embodiment of this disclosure as long as the first receiving portion 232 and the first protruding portion 231 can engage with each other after the substrates have been assembled, so that the movement of the first protruding portion 231 is restricted. For example, by the engagement, the first protruding portion 231 will not easily move in the direction parallel to a substrate extending plane (a plane constituted by a line parallel to the first direction D1 and a line parallel to the second direction D2, such as the X-Y plane), so that movements of the upper and lower substrates are restricted. Several embodiments will be explained in the following.

Second Embodiment

Figure 4:
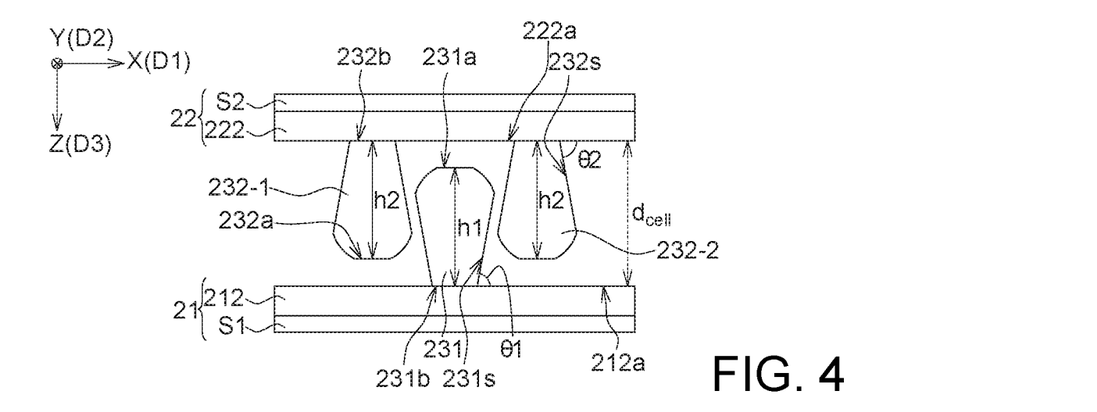
FIG. 4 is a partial schematic view showing a display panel according to a second embodiment of this disclosure.

FIG. 4 is a partial schematic view showing a display panel according to the second embodiment of this disclosure. In this embodiment, the display panel can include an alignment film, such as polyimide (PI) film. For easy explanation for the engaging structure, the alignment film is omitted in the figure. The same or similar reference numerals used in FIG. 4 and FIG. 2A and FIG. 2B are used to indicate the same or similar parts.

Referring to FIG. 4, the first substrate 21 includes a first sub-substrate S1 and a TFT layer 212. The second substrate 22 includes a second sub-substrate S2 and a CF layer 222. Associated elements of the TFT layer 212 and the CF layer 222 may refer to the above-mentioned descriptions. An engaging structure of the second embodiment includes the first protruding portion 231 disposed on the first substrate 21 (such as disposed on the first surface 212a of the first substrate 21) and the first receiving portion 232 disposed on the second substrate 22 (such as disposed on the second surface 222a of the second substrate 22). For example, the first protruding portion 231 is disposed on an insulating layer (e.g., a planarization layer including a nitride layer or an oxide layer) of the TFT layer 212 or on a conductive layer (e.g., ITO), and the first receiving portion 232 is disposed on an insulating layer (e.g., planarization layer) of the CF layer 222. In an embodiment, although not shown in the figure, a first alignment film can be disposed on the TFT layer 212, and a second alignment film can be disposed on the CF layer 222. In detail, the first alignment film can be disposed between the TFT layer 212 and at least one of the first part 232-1 and/or the second part 232-2 of the first receiving portion 232. According to other embodiments, the first alignment film can be further disposed on a top portion and/or sidewall of the first protruding portion 231. The second alignment film can be disposed between the CF layer 222 and the first protruding portion 231. According to other embodiments, the second alignment film can be further disposed on a top portion and/or sidewall of at least one of the first part 232-1 and/or the second part 232-2 of the first receiving portion 232.

In one embodiment, the height h1 of the first protruding portion 231 is smaller than the cell gap $d_{cell}$ of the display panel (i.e., the height $h_{MPS}$ of the first spacer 241, see FIG. 2B), the height h2 of the first receiving portion 232 is also smaller than the cell gap $d_{cell}$ of the display panel (i.e., the height $h_{MPS}$ of the first spacer 241, see FIG. 2B). Furthermore, the height h1 of the first protruding portion 231 and the height h2 of the first receiving portion 232 may be substantially the same or different from each other.

In one example, the height $h_{MPS}$ of the first spacer 241 ranges from, for example, 2.8 μm to 3.8 μm, the height $h_{SPS}$ of the second sub-spacer 242 ranges from, for example, 2.4 μm to 3.5 μm, the height h1 of the first protruding portion 231 and/or the height h2 of the first receiving portion 232 ranges from 2.0 μm to 2.6 μm, for example. In one example, the difference between the height (e.g., the maximum height) of the first protruding portion 231 and the height of the first spacer 241 ranges from 0.8 μm to 1.8 μm, for example; and the difference between the height (e.g., the maximum height) of the first receiving portion 232 and the height of the first spacer 241 ranges from 0.8 μm to 1.8 μm, for example. In one example, the height h1 of the first protruding portion 231 and the height h2 of the first receiving portion 232 are substantially the same. Of course, these numerical values are for illustrative purposes only and are not intended to limit the scope of application of the disclosure. The heights of the first spacer (e.g., the main spacer) and the second spacer (e.g., the sub-spacer) can be selected and changed according to the cell gap of the display panel required for the actual application.

Furthermore, in this embodiment, for example, the cross-sectional views of the first protruding portion 231 and the first receiving portion 232 can be in an inverted trapezoidal shape or in a shape similar to inverted trapezoid. After the substrates are assembled to each other, the first protruding portion 231 is engaged with the first receiving portion 232 and thus clamps the upper and lower substrates. As shown in FIG. 4, the first protruding portion 231 has an inverted trapezoidal cross-sectional shape, for example, with respect to the first surface 212a of the first substrate 21. Thus, a first included angle θ1 formed by one sidewall 231s of the first protruding portion 231 and the first surface 212a of the first substrate 21 is smaller than 90 degrees (θ1<90 degrees). For example, the first included angle θ1 can range from 60 to 89 degrees, and range from 70 to and 85 degrees. Similarly, the first receiving portion 232 has an inverted trapezoidal cross-sectional shape, for example, with respect to the second surface 222a of the second substrate 22. Thus, a second included angle θ2 between the one sidewall 232s of the first receiving portion 232 and the second surface 222a is smaller than 90 degrees (θ2<90 degrees). For example, the second included angle θ2 can range from 60 to 89 degrees, and range from 70 to and 85 degrees. The first included angle θ1 and the second included angle θ2 may be equal to or unequal to each other.

Of course, the protruding portion and the receiving portion of this disclosure are not limited to the inverted trapezoidal cross sectional shapes as long as the first protruding portion 231 and the corresponding first receiving portion 232 can mutually engage with each other. In some embodiments, the first protruding portion 231 has an upper surface 231a and a lower surface 231b disposed on the first substrate 21, and the area of the lower surface 231b of the first protruding portion 231 is smaller than the area of the upper surface 231a. The first receiving portion 232 can have a shape corresponding to the shape of the first protruding portion 231 for mutual assembling. For example, the first receiving portion 232 has an upper surface 232a and a lower surface 232b disposed on the second substrate 22, and the area of the lower surface 232b of the first receiving portion 232 is smaller than the area of the upper surface 232a. Thus, after engaging, the first protruding portion 231 and the first receiving portion 232 may further clamp the upper and lower substrates. When the display panel is bent, the relative movement between the first substrate 21 and the second substrate 22 can be restricted, and the uniformity of the cell gap of the display panel can be maintained consequently.

Third Embodiment

Figure 5:
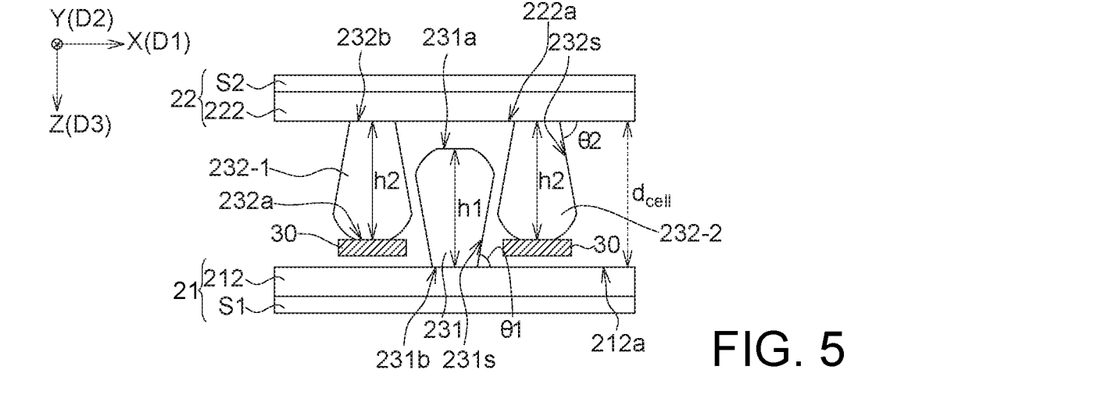
FIG. 5 is a partial schematic view showing a display panel according to a third embodiment of this disclosure.

FIG. 5 is a partial schematic view showing a display panel according to the third embodiment of this disclosure. In this embodiment, a display panel with an adhesive material is taken as an example for illustration. The same or similar reference numerals used in FIG. 5 and FIG. 4 are used to indicate the same or similar parts.

In the third embodiment, in addition to the structures described in the second embodiment, such as the first substrate 21, the second substrate 22, and the first protruding portion 231 and the first receiving portion 232 with inverted trapezoidal cross sectional shapes disposed on the first substrate 21 and the second substrate 22, the display panel further includes an adhesion structure 30. The adhesion structure 30 may be disposed between the first engaging structure 23 and one of the first substrate 21 and the second substrate 22. Specifically, the adhesion structure 30 can adhere to one of the first protruding portion 231 and the first receiving portion 232. For example, as shown in FIG. 5, the adhesion structure 30 can adhere to the first receiving portion 232, and disposed between the first receiving portion 232 and the first substrate 21. In detail, the adhesion structure 30 can adhere between at least one of the first part 232-1 and/or the second part 232-2 of the first receiving portion 232 and the first alignment film (not shown) on the first substrate 21. After the upper and lower substrates are assembled to each other, in addition to the engagement between the first protruding portion 231 and the first receiving portion 232 of the engaging structure for restricting the movements of the substrates in the X and Y directions, the adhesion structure 30 further adheres the upper surface 232a of the first receiving portion 232 to the first substrate 21 (or, to the first alignment film on the first substrate 21) to restrict the movements of the substrates in the third direction D3, such as the Z direction. According to other embodiments, although not shown in the figure, the adhesion structure 30 can adhere onto the first protruding portion 231, and disposed between the first protruding portion 231 and the second substrate 22. For example, the adhesion structure 30 is disposed on the alignment film corresponding to the first protruding portion 231 in FIG. 5. For example, the adhesion structure 30 can adhere between the first protruding portion 231 and the second alignment film (not shown) on the second substrate 22.

In one embodiment, the adhesion structure 30 can comprise a material of patternable adhesive resin (PAR), and has the property that can be patterned by photolithography. In one example, the adhesion structure 30 can comprise silicone resin. The adhesion structure 30 can comprise a photoresist material.

For example, the adhesive material such as the patternable adhesive resin adopted for forming the adhesion structure 30 of this disclosure may have different properties at different temperatures. For example, as shown in FIG. 5, the adhesion structure 30 can be formed at a temperature not exceeding 140° C. by photolithography without exhibiting any adhesive property. When the temperature is increased to higher than 140° C., the adhesion structure 30 generates the adhesive property. Considering a curing temperature of an alignment film in a typical process being higher than 200° C., it is suggested that after the alignment film is formed, then the adhesion structure 30 can be formed on the alignment film, thereby obtaining the adhesion structure 30 without generating any the adhesive property. After the substrates are assembled to each other, the temperature can be increased to over 140° C. so that the adhesion structure 30 as formed can generate the adhesive property. In one embodiment, the adhesion structure 30 can generate the adhesive property at the temperature ranging from 140° C. to 200° C. Alternatively, the temperature higher than 200° C. but not higher than a temperature capable of deforming the associated elements of the display panel and affecting the electrical performance and display quality of the panel can be applied, and the adhesion structure 30 generates the adhesive property.

Fourth Embodiment

Figure 6A:
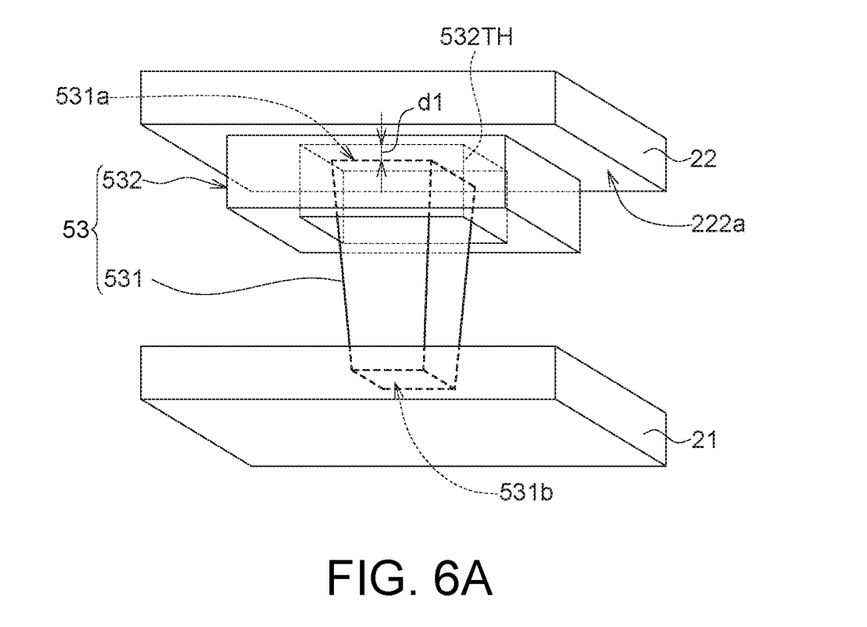
FIG. 6A and FIG. 6B are schematic views showing an engaging structure of a display panel according to a fourth embodiment of this disclosure.
Figure 6B:
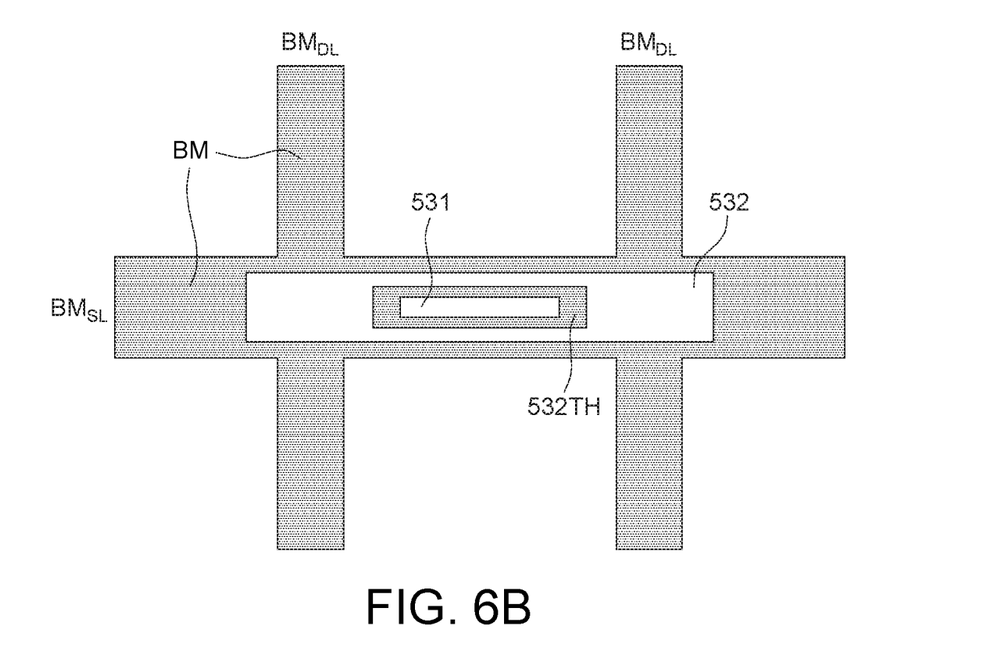

FIG. 6A and FIG. 6B are schematic views showing an engaging structure 53 of a display panel according to the fourth embodiment of this disclosure. The same or similar reference numerals used in FIG. 6A and FIG. 6B and FIG. 2A, FIG. 2B and FIG. 4 are used to indicate the same or similar parts. The details of the same elements/configurations may refer to the above-mentioned descriptions, and will not be redundantly repeated here. In this embodiment, the receiving portion 532 of the engaging structure is disposed to surround the protruding portion 531.

As shown in FIG. 6A, the protruding portion 531 and the receiving portion 532 are respectively disposed on the first substrate 21 and on the second substrate 22. The protruding portion 531 has an upper surface 531a and a lower surface 531b disposed on the first substrate 21, the lower surface 531b is smaller than the upper surface 531a, and the receiving portion 532 has an opening, for example. In one embodiment, the protruding portion 531 is a in a pillar shape having an inverted trapezoidal cross sectional view. After the first substrate 21 and second substrate 22 are assembled to each other, the protruding portion 531 engages with the receiving portion 532.

The receiving portion 532 has an opening 532TH, which exposes a portion of the second surface 222a of the second substrate 22. After the first substrate 21 and the second substrate 22 are assembled to each other, the protruding portion 531 is spaced apart from the portion of the second surface 222a exposed by the opening 532TH (see also the distance dl in FIG. 2B). In this embodiment, as shown in FIG. 6A, a longitudinal receiving portion 532 having a longitudinal opening 532TH is provided, and the protruding portion 531 has an inverted trapezoidal cross sectional shape (e.g., the protruding portion 531 is a in a pillar shape having an inverted trapezoidal cross sectional view).

Furthermore, FIG. 6B is a top view showing an engaging structure of FIG. 6A. In one example, as shown in FIG. 6B, a light shielding layer such as a black matrix BM may be disposed on the first substrate 21 or the second substrate 22, and an engaging structure of an embodiment is disposed corresponding to the light shielding layer. The black matrix BM may include a plurality of transversal light-shielding portions $BM_{SL}$ corresponding to positions of gate lines (not shown); and a plurality of longitudinal light-shielding portions $BM_{DL}$ corresponding to data lines (not shown). The transversal light-shielding portions $BM_{SL}$ and the longitudinal light-shielding portions $BM_{DL}$ may be staggered. For example, an engaging structure 53 of this embodiment may be disposed at the positions corresponding to the gate lines, may be disposed at the transversal light-shielding portion $BM_{SL}$ corresponding to the black matrix.

Fifth Embodiment

Figure 7A:
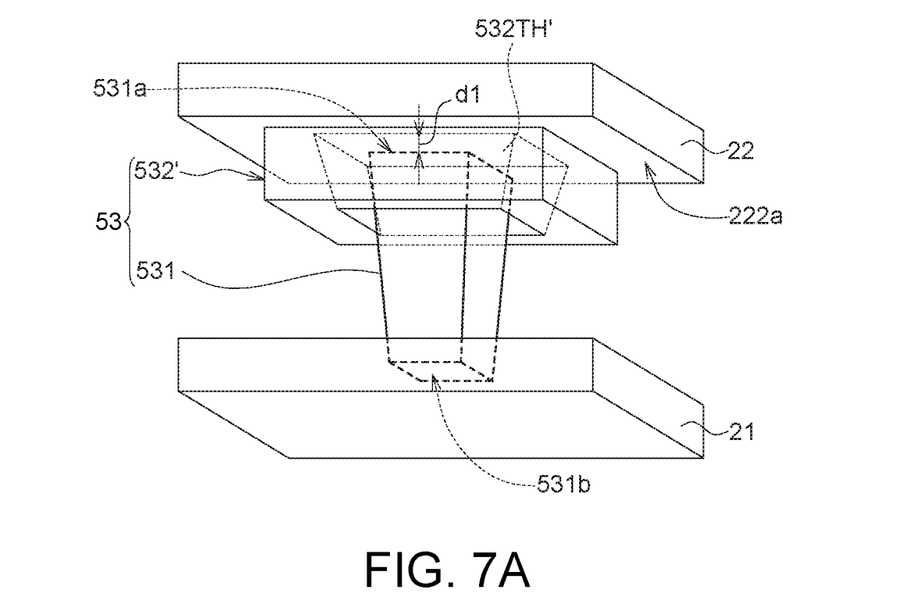
FIG. 7A and FIG. 7B are schematic views showing an engaging structure of a display panel according to a fifth embodiment of this disclosure.
Figure 7B:
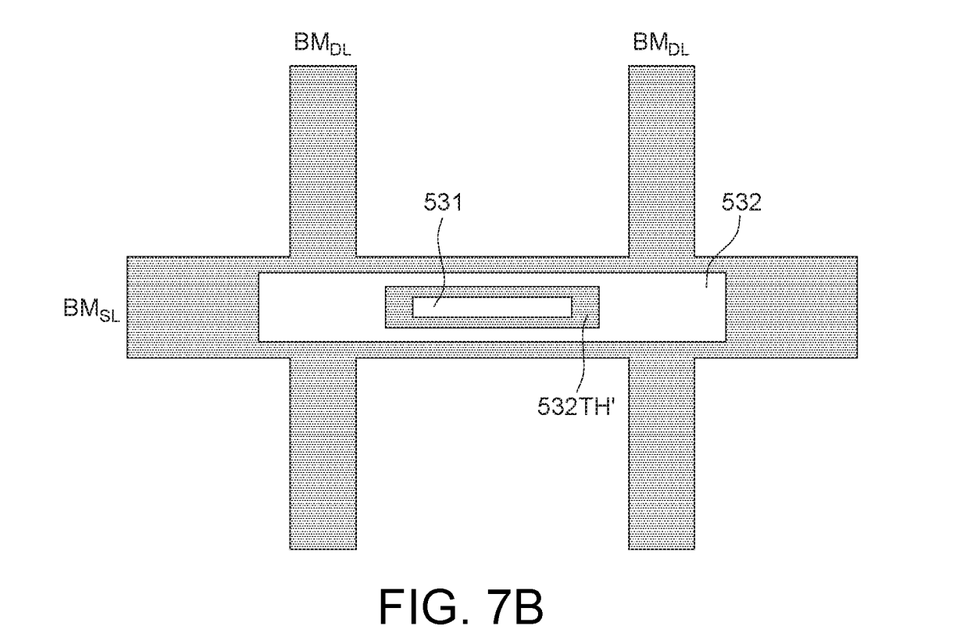

FIG. 7A and FIG. 7B are schematic views showing an engaging structure 53 of a display panel according to the fifth embodiment of this disclosure. The same or similar reference numerals used in FIG. 7A and FIG. 7B and FIG. 6A and FIG. 6B are used to indicate the same or similar parts. The details of the same elements/configurations may refer to the above-mentioned descriptions, and will not be redundantly repeated here. In this embodiment, the receiving portion 532' of the engaging structure may also be disposed to surround the protruding portion 531.

The engaging structures of the fifth and fourth embodiments are similar except for the main difference residing in that the opening 532TH' of the receiving portion 532' of the fifth embodiment has an inverted trapezoidal cross-sectional shape. That is, the opening 532TH' has a smaller volume in a position closer to the first substrate 21, and a larger volume in a position closer to the second substrate 22. According to some embodiments, the opening 532TH' has a decreasing volume toward the first substrate 21. The protruding portion 531 of the fifth embodiment is the same as the fourth embodiment and also has an inverted trapezoidal cross sectional shape (e.g., an inverted trapezoidal pillar). After the substrates are assembled to each other, the protruding portion 531 engages with the opening 532TH' of the receiving portion 532' to clamp the upper and lower substrates.

Sixth Embodiment

Figure 8A:
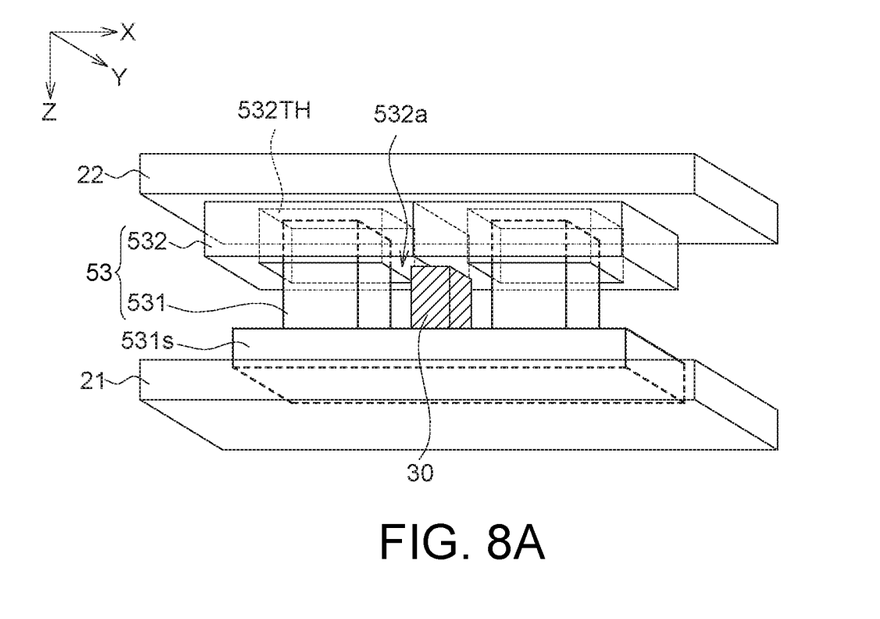
FIG. 8A is a schematic view showing an engaging structure of a display panel according to a sixth embodiment of this disclosure.
Figure 8B:
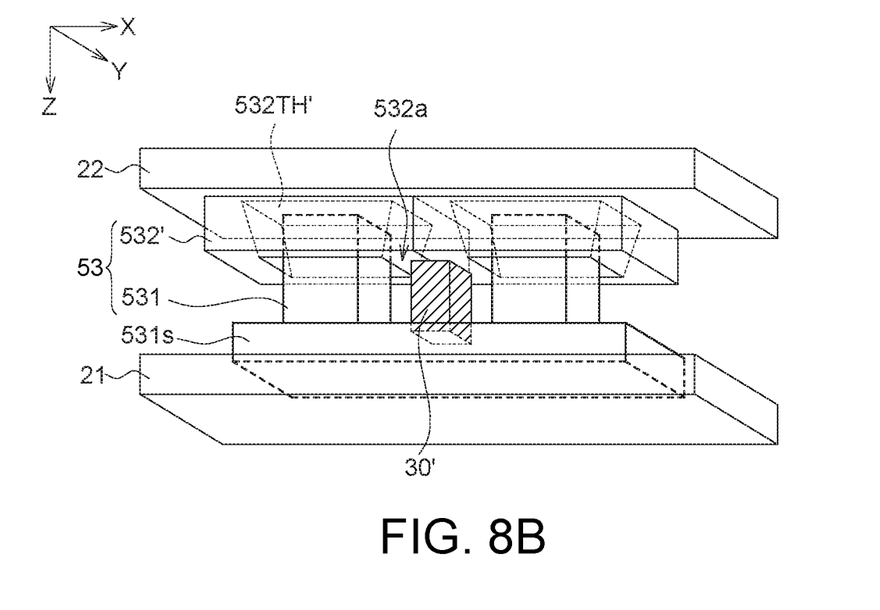
FIG. 8B is a schematic view showing another engaging structure of a display panel according to the sixth embodiment of this disclosure.

In one embodiment, the protruding portion 531 with the convex pattern and/or the receiving portion 532 with the concave pattern may be provided on the upper and lower substrates, and a plurality of adhesion structures are provided at the engaging structure, wherein the adhesion structures are adhered to at least one of the protruding portion and the receiving portion. FIG. 8A is a schematic view showing an engaging structure of a display panel according to the sixth embodiment of this disclosure. FIG. 8B is a schematic view showing another engaging structure of a display panel according to the sixth embodiment of this disclosure. The same or similar reference numerals used in FIG. 8A, FIG. 8B and FIG. 6A are used to indicate the same or similar parts. The details of the same elements/configurations may refer to the above-mentioned descriptions, and will not be redundantly repeated here.

FIG. 8A shows two adjacent first engaging structures 53. The first protruding portions 531 in the two adjacent first engaging structures 53 may be disposed on a fixing portion 531s. The fixing portion 531s is disposed on the first substrate 21. In this embodiment, the receiving portion 532 with the concave pattern and the protruding portion 531 with the convex pattern are respectively disposed on the upper and lower substrates, and the adhesive material, such as the adhesion structure 30, is placed between the two adjacent engaging structures. After the upper and lower substrates are assembled to each other, the engagement of the protruding portion 531 and the receiving portion 532 and the adhering of the adhesive material can be used to restrict the relative movement between the upper and lower substrates. Furthermore, in this embodiment, two adjacent engaging structures are described as examples, and a receiving portion 532 is also disposed to surround the corresponding protruding portion 531.

As shown in FIG. 8A, the adhesion structure 30 in this embodiment is disposed between two adjacent first engaging structures 53 and is disposed on a fixing portion 531s. After the upper and lower substrates are assembled to each other, the engagement between the protruding portion 531 and the receiving portion 532 can restrict the movements of the substrates in the X and Y directions, the adhesion structure 30 on the alignment film can be adhered to the upper surface 532a of the receiving portion 532 to restrict the movements of the substrates in the Z direction. In one example, the adhesion structure 30 may be disposed between the two adjacent protruding portions 531 to adhere the upper surfaces 532a of the two adjacent receiving portions 532 together. In detail, the adhesion structure 30 can adhere between the fixing portion 531s and the receiving portion 532. In an embodiment, the adhesion structure 30 can adhere between the receiving portion 532 and the first alignment film (not shown) on the fixing portion 531s. According to other embodiments, although not shown in figures, the adhesion structure 30 can adhere to the protruding portion 531, and disposed between the protruding portion 531 and the second substrate 22. For example, the adhesion structure 30 can adhere between the protruding portion 531 and the second alignment film (not shown) on the second substrate 22. According to other embodiments, the alignment film can be disposed on the protruding portion 531 and/or the fixing portion 531s, and under the adhesion structure 30. In another embodiment, the alignment film can be disposed on the receiving portion 532. That is, the receiving portion 532 is disposed between the alignment film and the second substrate 22.

Furthermore, the difference between FIG. 8B and FIG. 8A resides in that the opening 532TH of the longitudinal receiving portion 532 shown in FIG. 8A has a rectangular cross-sectional shape; while the opening 532TH' of the longitudinal receiving portion 532' shown in FIG. 8B has an inverted trapezoidal cross-sectional shape. That is, in FIG. 8B, the opening 532TH' has a smaller volume in a position closer to the first substrate 21, and a larger volume in a position closer to the second substrate 22. According to some embodiments, the opening 532TH' has a decreasing volume toward the first substrate 21. The adhesion structure 30/30' shown in FIG. 8A and FIG. 8B can be formed at the predetermined position and reach the predetermined height by way of photolithography according to the requirement of the practical application to meet the needs of the application. Other descriptions relevant to the adhesive material (adhesion structure 30/30') may refer to the third embodiment, and will not be redundantly repeated here.

Seventh Embodiment

Figure 9A:
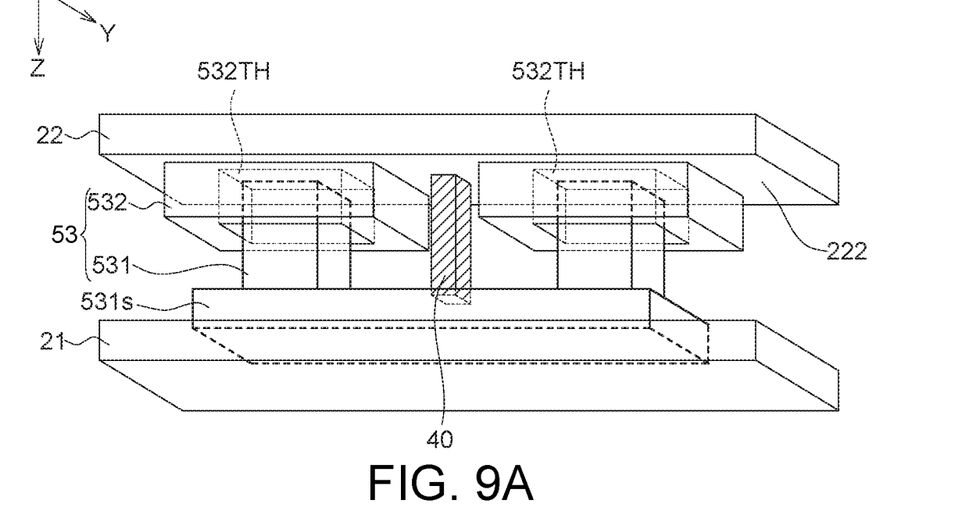
FIG. 9A is a schematic view showing an engaging structure of a display panel according to a seventh embodiment of this disclosure.
Figure 9B:
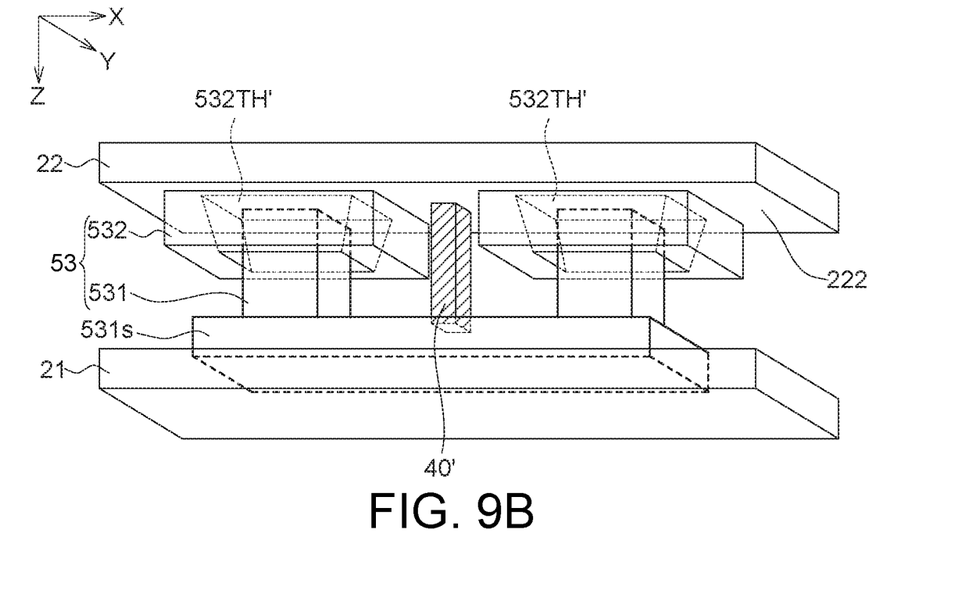
FIG. 9B is a schematic view showing another engaging structure of a display panel according to the seventh embodiment of this disclosure.

FIG. 9A is a schematic view showing an engaging structure of a display panel according to the seventh embodiment of this disclosure. FIG. 9B is a schematic view showing another engaging structure of a display panel according to the seventh embodiment of this disclosure. The same or similar reference numerals used in FIG. 9A and FIG. 9B and FIG. 8A and FIG. 8B are used to indicate the same or similar parts. The details of the same elements/configurations may refer to the contents of other embodiments mentioned hereinabove, and will not be redundantly repeated here.

The seventh embodiment (e.g., FIG. 9A and FIG. 9B) and the sixth embodiment (e.g., FIG. 8A and FIG. 8B) have the similar structures except for the main difference residing in the relative positions between the adhesion structure and two receiving portions of two adjacent engaging structures. The adhesive material (e.g., the adhesion structure 40/40') of the seventh embodiment is disposed between two adjacent engaging structures 53, as shown in the example of FIG. 9A and FIG. 9B, the two receiving portions 532/532' of the two adjacent engaging structures are spaced apart from each other by a space, and the two adjacent protruding portions 531 are disposed on a fixing portion 531s. The adhesion structure 40/40' has one end disposed on the fixing portion 531s where the two adjacent protruding portions 531 are located, and the other end of the adhesion structure 40/40' is located in the space between the two adjacent receiving portions 532/532'. In the seventh embodiment, after the upper and lower substrates are assembled to each other, the protruding portion 531 and the receiving portion 532/532' can restrict the movements of the substrates in the X and Y directions. In addition, the adhesion structure 40/40' adheres to the second substrate 22 and the fixing portion 531s where the protruding portions 531 are located. Thus, the movements of the substrates in the Z direction can be restricted.

Furthermore, the difference between FIG. 9B and FIG. 9A resides in that, the opening 532TH of the longitudinal receiving portion 532 shown in FIG. 9A has a rectangular cross-sectional shape; and the opening 532TH' of the longitudinal receiving portion 532' shown in FIG. 9B has an inverted trapezoidal cross-sectional shape. That is, in FIG. 9B, the opening 532TH' has a smaller volume in a position closer to the first substrate 21, and a larger volume in a position closer to the second substrate 22. According to some embodiments, the opening 532TH' has a decreasing volume toward the first substrate 21. In addition, descriptions relevant to the adhesive material (adhesion structure 40/40') may refer to the above-mentioned descriptions, and will not be redundantly repeated here.

Eighth Embodiment

Figure 10:
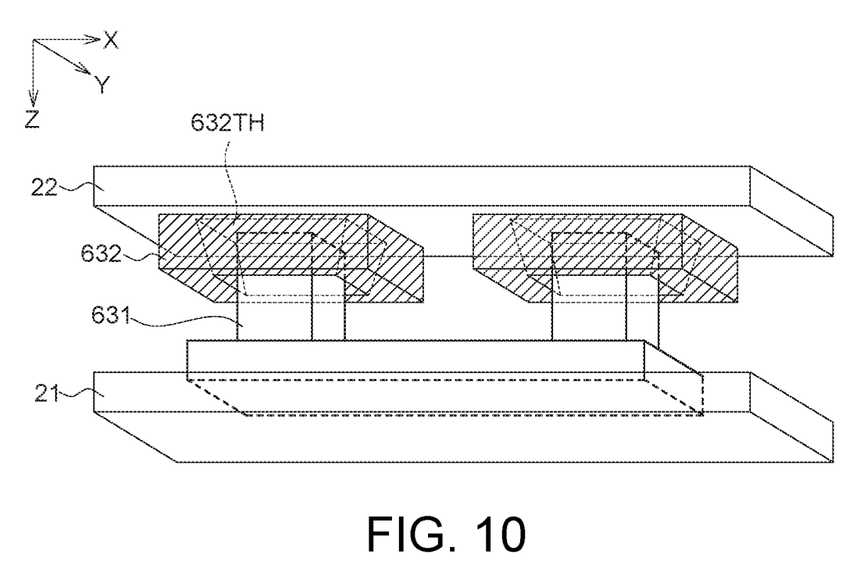
FIG. 10 is a schematic view showing an engaging structure of a display panel according to an eighth embodiment of this disclosure.

FIG. 10 is a schematic view showing an engaging structure of a display panel according to the eighth embodiment of this disclosure. The same or similar reference numerals used in FIG. 10 and FIG. 9A and FIG. 9B are used to indicate the same or similar parts. The details of the same elements/configurations may refer to the contents of other embodiments mentioned hereinabove, and will not be redundantly repeated here. In this embodiment, an adhesive material is used to directly manufacture at least one of the protruding portion 631 and the receiving portion 632 of the engaging structure of this embodiment. As shown in FIG. 10, an adhesive material is used to manufacture the receiving portion 632. The adhesive material may comprise, for example, the patternable adhesive resin (PAR) material, having the property that can be pattered by photolithography. Thus, the receiving portion 632 shown in FIG. 10 can be formed at the predetermined position and reach the predetermined shape by means of photolithography according to the requirement of the practical application. Properties including the height of the receiving portion 632 and the size and the shape of the opening 632TH can be precisely controlled.

Furthermore, after the upper and lower substrates have assembled to each other and the protruding portion 631 and the receiving portion 632 engage with each other, the temperature higher than, for example, 140° C., can be applied, so that the receiving portion 632 generates the adhesive property, and the engaging structure of this embodiment has the structural engagement and the material's adhesive property, to restrict the movements of the upper and lower substrates in the X, Y and Z directions.

Ninth Embodiment

Figure 11A:
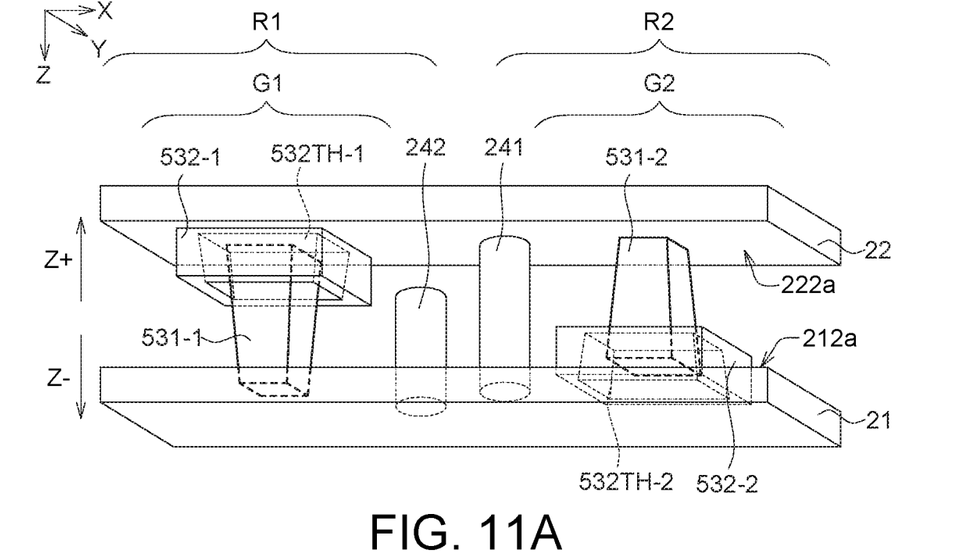
FIG. 11A is a schematic view showing an engaging structure of a display panel according to a ninth embodiment of this disclosure.
Figure 11B:
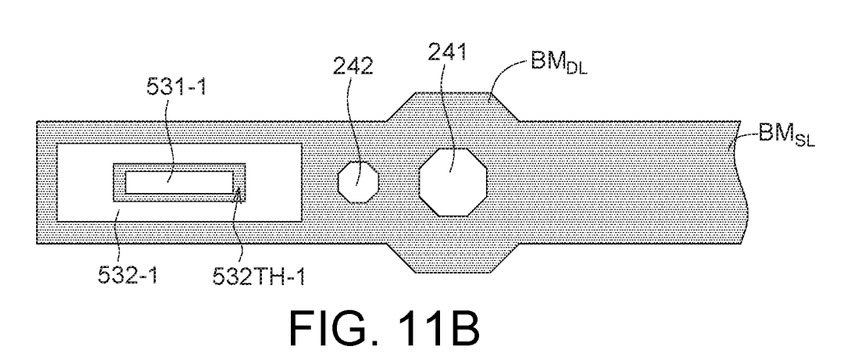
FIG. 11B is a top view showing the engaging structure on the left side in FIG. 11A.
Figure 11C:
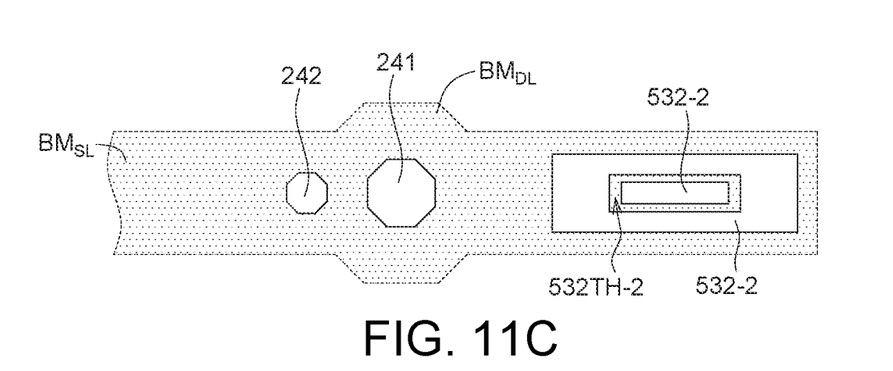
FIG. 11C is a top view showing the engaging structure on the right side in FIG. 11A.

FIG. 11A is a schematic view showing an engaging structure of a display panel according to the ninth embodiment of this disclosure. FIG. 11B is a top view showing the engaging structure on the left side in FIG. 11A. FIG. 11C is a top view showing the engaging structure on the right side in FIG. 11A. The same or similar reference numerals used in FIG. 11A to FIG. 11C and FIG. 7A and FIG. 7B are used to indicate the same or similar parts. The details of the same elements/configurations may refer to the contents of other embodiments mentioned hereinabove, and will not be redundantly repeated here. In this embodiment, protruding portions and receiving portions are provided on the upper and lower substrates, which can be applied to manufacture a curved display panel with different bending extents or different bending manners.

The display panel of this disclosure may be applied to the curved display panel. In some applications, the display panel may have two or more than two curved regions due to the application requirement. For example, as shown in FIG. 11A, the display panel has a first curved region R1 and a second curved region R2, which have different curving directions. For example, the first curved region R1 is bent in the Z+ direction, and the second curved region R2 is bent in the Z− direction (opposite to the Z+ direction). Thus, there is an inflection between the first curved region R1 and the second curved region R2. That is, an inflection point can be observed from the side of the display panel. For example, from a cross-sectional view, a convex profile in one of the first and second curved regions is changed to a concave profile in the other region, or a concave profile is changed to the convex profile, or several concave and convex profiles are configured as a combination of curved regions. For the convenience of explanation, the display panel of FIG. 11A is in the non-curved state. A plurality of sets of engaging structures as mentioned in the above embodiments may be disposed on two sides of the upper and lower substrates, and the protruding portion and the receiving portion are provided at each substrate corresponding to different curved regions. Of course, the display panel may be curved in different directions due to the improper external forces, and the configuration of this embodiment may also be applied to increase the structural strength between the substrates in multiple directions and to keep the cell gap of the display panel.

In one embodiment, the display panel includes, for example, a first set of engaging structures G1 and a second set of engaging structures G2. In the following, each of the sets of the engaging structures are described by taking one protruding portion and one corresponding receiving portion as an example. Referring to FIG. 11A, the first set of engaging structures G1 include a first protruding portion 531-1 disposed on the first surface 212a of the first substrate 21, and a corresponding first receiving portion 532-1 disposed on the second surface 222a of the second substrate 22. The second set of engaging structures G2 include a second protruding portion 531-2 disposed on the second surface 222a of the second substrate 22, and a corresponding second receiving portion 532-2 disposed on the first surface 212a of the first substrate 21. Thus, the upper and lower substrates are provided with protruding portions, and also provided with receiving portions. According to some embodiments, the first engaging structure G1 may be disposed in the first curved region R1, and the second engaging structure G2 may be disposed in the second curved region R2. The protruding portions of the first engaging structure G1 and the second engaging structure G2 are respectively disposed on different substrates, and the receiving portions thereof are respectively disposed on different substrates, so that the stresses exerted on the first curved region R1 and the second curved region R2 in different curving directions can be balanced, and that the display effect of the display panel cannot be affected by curving. After the first substrate 21 and second substrate 22 are assembled to each other, the first protruding portion 531-1 and the second receiving portion 532-2 disposed on the side of the first substrate 21 clamp the upper and lower substrates respectively through the opening 532TH-1 and the opening 532TH-2, as well as the mutual engagement between the first receiving portion 532-1 and the second protruding portion 531-2 disposed on the side of the second substrate 22. Upon practical applications, the patterns of the protruding portion and the receiving portion are not particularly limited. If the pattern of FIG. 11A, in which the receiving portion surrounds the protruding portion, then both of them engage with each other to strengthen the restrictions of the movements of the substrates on the X-Y plane. In addition, it is also possible to add the adhesive material similar to the above-mentioned embodiment, or to use the adhesive material to manufacture one of the protruding portion and the receiving portion to strengthen the restrictions of the movements of the substrates in the Z direction. The structures/elements disclosed in the above-mentioned embodiments may also be combined, modified or adjusted according to the requirements of the practical applications.

FIG. 11B is a top view showing the second substrate 22 in FIG. 11A. FIG. 11C is a top view showing the first substrate 21 in FIG. 11A. FIGS. 11B and 11C also show the configuration positions of the first spacer (e.g., the main spacer) 241 and the second spacer (e.g., the sub-spacer) 242. The first spacer 241 and the second spacer 242 may be concurrently disposed on the first substrate 21 or the second substrate 22. Alternatively, the first spacer 241 may be disposed on one of the first substrate 21 and the second substrate 22, and the second spacer 242 may be disposed on the other one of the first substrate 21 and the second substrate 22. For example, the first spacer 241 and the second spacer 242 may be concurrently disposed on the second substrate 22. For example, the engaging structure of this embodiment is disposed at the portions corresponding to the gate line. FIG. 11B and FIG. 11C simply depict a local portion of a light shielding layer (such as the black matrix), one transversal light-shielding portion $BM_{SL}$ (corresponding to the position of the gate line) and one longitudinal light-shielding portion $BM_{DL}$ (corresponding to the position of the data line) are partially displayed, wherein both of them are interlaced with each other. Furthermore, FIG. 11B is a top view showing an engaging structure (e.g., pertaining to one of the first set of engaging structures G1) disposed on the left side in FIG. 11A. FIG. 11C is a top view showing an engaging structure (e.g., pertaining to one of the second set of engaging structures G2) disposed on the right side in FIG. 11A. After the substrates are assembled to each other, the positions (FIG. 11B) of the protruding portion 531-1 and the receiving portion 532-1 are disposed on the left side, the positions of the protruding portion 531-2 and the receiving portion 532-2 are disposed on the right side, and the position (FIG. 11C) of the second spacer 242 correspond to, for example, the position of the transversal light-shielding portion $BM_{SL}$ of the black matrix. For example, the position of the first spacer 241 corresponds to the interlaced position between the transversal light-shielding portion $BM_{SL}$ and the longitudinal light-shielding portion $BM_{DL}$ (e.g., the interlaced position corresponds to the TFT and has the larger black matrix shielding area). In addition, upon the practical application, the dimensions of the associated elements, such as the dimensions of the protruding portion, the receiving portion, the first spacer (e.g., the main spacer), the second spacer (e.g., the sub-spacer) can be determined according to the application condition. This disclosure does not intend to limit the dimensions of the associated elements.

Figure 12A:
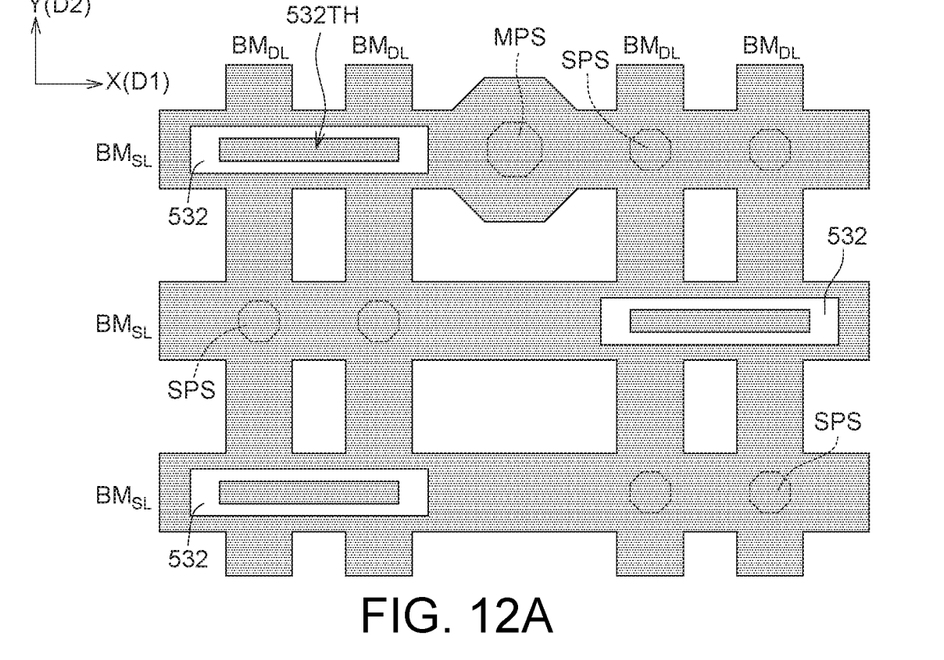
FIG. 12A and FIG. 12B are schematic diagrams showing one of configurations, in which the engaging structure according to the embodiment of this disclosure is applied to a display panel.
Figure 12B:
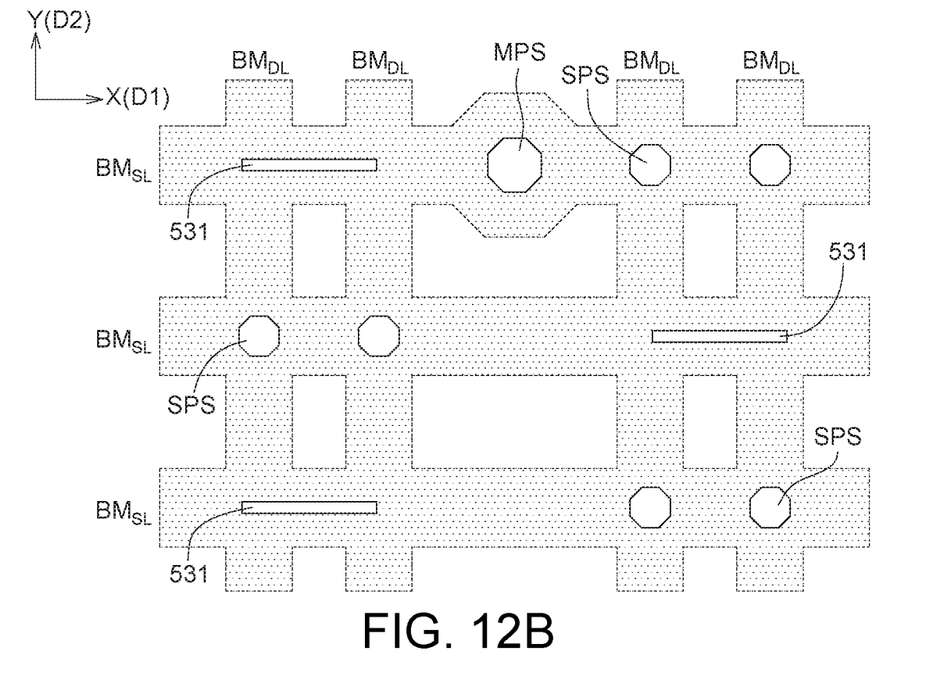

Furthermore, when the embodiment is applied, a portion of the second spacer (e.g., the sub-spacer) of the display panel may be replaced with the engaging structure of this embodiment, or the engaging structure of the embodiment is directly disposed, and this disclosure is not limited thereto. FIG. 12A and FIG. 12B are schematic diagrams showing one of configurations, in which the engaging structure according to the embodiment of this disclosure is applied to a display panel. FIG. 12A is a top view showing the configuration of the receiving portion 532. FIG. 12B is a top view showing the configuration of the protruding portion 531. FIG. 12A and FIG. 12B also show the configuration positions of the spacers MPS and the sub-spacers SPS. According to some embodiments, the position of the engaging structure can be determined according to the requirements of the applied embodiments. The arrangement density of the engaging structure may be greater or smaller than the arrangement density of the main spacer MPS, and the arrangement density of the sub-spacer SPS may be greater or smaller than the arrangement density of the main spacer MPS. For example, as shown in FIG. 12A, the arrangement density of the engaging structure may be greater than the arrangement density of the main spacer MPS, and is smaller than the arrangement density of the sub-spacer SPS. Of course, those skilled in the art may understand that the associated positions of the transversal light-shielding portion $BM_{SL}$ of the black matrix, the longitudinal light-shielding portion $BM_{DL}$ of the black matrix and the TFT shown in FIG. 12A and FIG. 12B, and the configuration of the engaging structure of this embodiment are not limited to the examples as shown in FIG. 12A and FIG. 12B, and can be properly selected and arranged according to the requirements of the practical applications.

In summary, according to some embodiments, the display panel restricts the relative movement between the upper and lower substrates by means of the engaging structures to keep the uniformity of the cell gap of the display panel. According to some embodiments, when the display panel is improperly forced to generate the bending condition or is manufactured to have a curved region due to the application requirement, the engaging structure can keep the uniformity of the cell gap of the display panel, so that the panel reaches good brightness uniformity. Thus, the display panel can have stable and excellent display effects.

In other embodiments, for example, the known members of the elements have different configurations, arrangements and the like, and are also applicable. Appropriate adjustments or modifications depending on the actual requirements and conditions of the application can be made. For example, although the alignment film is depicted in the drawings of the above-mentioned embodiments and the adhesion structure of the embodiment is disposed on the alignment film, this disclosure is not limited thereto, and the adhesion structure of the embodiment can be provided according to the requirements of the applications (e.g., the display panel without the alignment film also one of the applicable types of this disclosure). Thus, the structure shown in the specification and drawings is for illustrative purposes only and is not intended to limit the scope of this disclosure. In addition, those skilled in the art should understand that the shape and position of the constituent components in the embodiment are also not limited to those illustrated in the drawings, and may also be adjusted according to the needs and/or manufacturing steps of the actual application without departing from the spirit of the disclosure.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
a first substrate;
a second substrate disposed opposite to the first substrate;
a display medium disposed between the first substrate and the second substrate; and
a first engaging structure, comprising:
a first protruding portion disposed on a first surface of the first substrate; and
a first receiving portion disposed on a second surface of the second substrate, wherein the first receiving portion has a first opening to expose a portion of the second surface of the second substrate,
wherein at least a portion of the first protruding portion is disposed in the first opening of the first receiving portion, and the first protruding portion and the portion of the second surface of the second substrate are spaced apart by a distance;
wherein in a cross-sectional view, the first protruding portion has a first upper width and a first lower width, the first lower width is closer to the first substrate, and the first lower width is smaller than the first upper width; and
wherein in the cross-sectional view, the first opening of the first receiving portion has a second upper width and a second lower width, the second upper width is closer to the second substrate, and the second lower width is smaller than the second upper width.

2. The display panel according to claim 1, wherein in the cross-sectional view, an included angle formed by a sidewall of the first protruding portion and the first surface of the first substrate is smaller than 90 degrees.

3. The display panel according to claim 1, wherein the first receiving portion includes two parts, and the two parts are disposed corresponding to at least two opposite sides of the first protruding portion.

4. The display panel according to claim 3, wherein at least one of the two parts includes a second opening, and the second opening is adjacent to one of the at least two opposite sides of the first protruding portion.

5. The display panel according to claim 4, wherein one of the at least two opposite sides of the first protruding portion is received in the second opening.

6. The display panel according to claim 1, wherein the first receiving portion surrounds the first protruding portion.

7. The display panel according to claim 1, wherein the first opening is surrounded by the first receiving portion.

8. The display panel according to claim 1, wherein the first engaging structure comprises a photoresist material.

9. The display panel according to claim 1, wherein the first engaging structure comprises an adhesive material.

10. The display panel according to claim 1, further comprising a first spacer, wherein a height of the first spacer is greater than a height of the first protruding portion.

11. The display panel according to claim 1, wherein the first protruding portion has a height ranging from 2.0 µm~2.6 µm.

12. The display panel according to claim 1, further comprising an adhesion structure disposed between the first engaging structure and one of the first substrate and the second substrate.

13. The display panel according to claim 12, wherein the adhesion structure adheres between the first receiving portion and the first substrate.

14. The display panel according to claim 12, wherein the adhesion structure comprises a photoresist material.

15. The display panel according to claim 1, wherein one of the first substrate and the second substrate includes a light shielding layer, and the first engaging structure is disposed corresponding to the light shielding layer.

16. The display panel according to claim 1, wherein the display panel is a curved display panel.

17. A display panel, comprising:
a first substrate;
a second substrate disposed opposite to the first substrate;
a display medium disposed between the first substrate and the second substrate;
a first engaging structure, comprising:
a first protruding portion disposed on a first surface of the first substrate; and
a first receiving portion disposed on a second surface of the second substrate, wherein the first receiving portion has a first opening to expose a portion of the second surface of the second substrate, and
a second engaging structure, comprising:
a second protruding portion disposed on the second surface of the second substrate; and
a second receiving portion disposed on the first surface of the first substrate, wherein at least a portion of the second protruding portion is disposed in the second receiving porion;
wherein at least a portion of the first protruding portion is disposed in the first opening of the first receiving portion, and the first protruding portion and the portion of the second surface of the second substrate are spaced apart by a distance.

18. The display panel according to claim 17, wherein the first engaging structure comprises an adhesive material.

19. A display panel, comprising:
a first substrate;
a second substrate disposed opposite to the first substrate;
a display medium disposed between the first substrate and the second substrate;
a first engaging structure, comprising:
a first protruding portion disposed on a first surface of the first substrate; and
a first receiving portion disposed on a second surface of the second substrate, wherein the first receiving portion has a first opening to expose a portion of the second surface of the second substrate, and
a second engaging structure, comprising:
a second protruding portion disposed on the second surface of the second substrate; and
a second receiving portion disposed on the first surface of the first substrate, wherein at least a portion of the second protruding portion is disposed in the second receiving portion;
wherein the display panel is a curved display panel, the display panel has a first curved region and a second curved region, the first curved region and the second curved region have different curving directions, the first engaging structure is disposed in the first curved region, and the second engaging structure is disposed in the second curved region; and
wherein at least a portion of the first protruding portion is disposed in the first opening of the first receiving portion, and the first protruding portion and the portion of the second surface of the second substrate are spaced apart by a distance.

20. The display panel according to claim 19, wherein the first engaging structure comprises an adhesive material.

* * * * *